(12) United States Patent
Narendra

(10) Patent No.: US 11,386,737 B2
(45) Date of Patent: Jul. 12, 2022

(54) DIGITAL DOCUMENT VALIDATION

(71) Applicant: iCashe, Inc., Portland, OR (US)

(72) Inventor: Siva G. Narendra, Portland, OR (US)

(73) Assignee: iCashe, Inc., Portland, OR (US)

( * ) Notice: Subject to any disclaimer, the term of this patent is extended or adjusted under 35 U.S.C. 154(b) by 117 days.

(21) Appl. No.: 17/015,345

(22) Filed: Sep. 9, 2020

(65) Prior Publication Data

US 2022/0076520 A1 Mar. 10, 2022

(51) Int. Cl.
*G07C 13/02* (2006.01)
*G06F 21/60* (2013.01)
*G06F 21/62* (2013.01)
*H04N 1/00* (2006.01)

(52) U.S. Cl.
CPC ........... *G07C 13/02* (2013.01); *G06F 21/608* (2013.01); *G06F 21/6209* (2013.01); *H04N 1/00737* (2013.01); *H04N 1/00766* (2013.01); *H04N 1/00782* (2013.01); *H04N 1/00803* (2013.01)

(58) Field of Classification Search
CPC .............. G06F 21/608; G06F 21/6209; H04N 1/00737; H04N 1/00766; H04N 1/00782; H04N 1/00803; G07C 13/00; G07C 13/02
See application file for complete search history.

(56) References Cited

U.S. PATENT DOCUMENTS

2015/0039403 A1\* 2/2015 Grossberg .............. G07C 13/00
705/12

FOREIGN PATENT DOCUMENTS

JP 2006157914 A \* 6/2006 ............. G06F 21/64

\* cited by examiner

*Primary Examiner* — Laura A Gudorf
(74) *Attorney, Agent, or Firm* — Mughal IP P.C.

(57) ABSTRACT

A user device transmits a digital representation of a document or contract to a document or contract validation system through one or more channels. The document or contract validation system validates the document or contract before submitting the document or contract to a transaction system as a valid transaction. The digital representation of the document or contract may include one or more sets of parameters that are useful in the validation process.

20 Claims, 11 Drawing Sheets

DIGITAL DOCUMENT VALIDATION

FIELD

The present invention relates generally to document or contract validation, and more specifically to digital document or contract validation.

BACKGROUND

Typical document or contract acceptance systems include a scanner to scan a paper document, a computer or network to store a digital representation of the document, and a physical storage site to store the original paper document. FIG. 1 shows such a prior art document or contract acceptance system 100. Paper document or contract 110 is scanned by scanner 120, and a digital representation of the paper document or contract is retrieved by scanning computer 130, and optionally sent on to another destination through network 140. Scanning may create an identical and complete or a partial but essential representation of the paper document. Paper document or contract 110 is also shown being stored in storage 160 after physical transport 150.

A typical use for document or contract acceptance system 100 is scanning and storing voter ballots. Paper document or contract 110 may represent a marked ballot that is scanned for tallying votes. The stored paper document(s) may be later accessed in the event that validation of the digital representation of ballots is needed.

DESCRIPTION OF EMBODIMENTS

Figure 1:
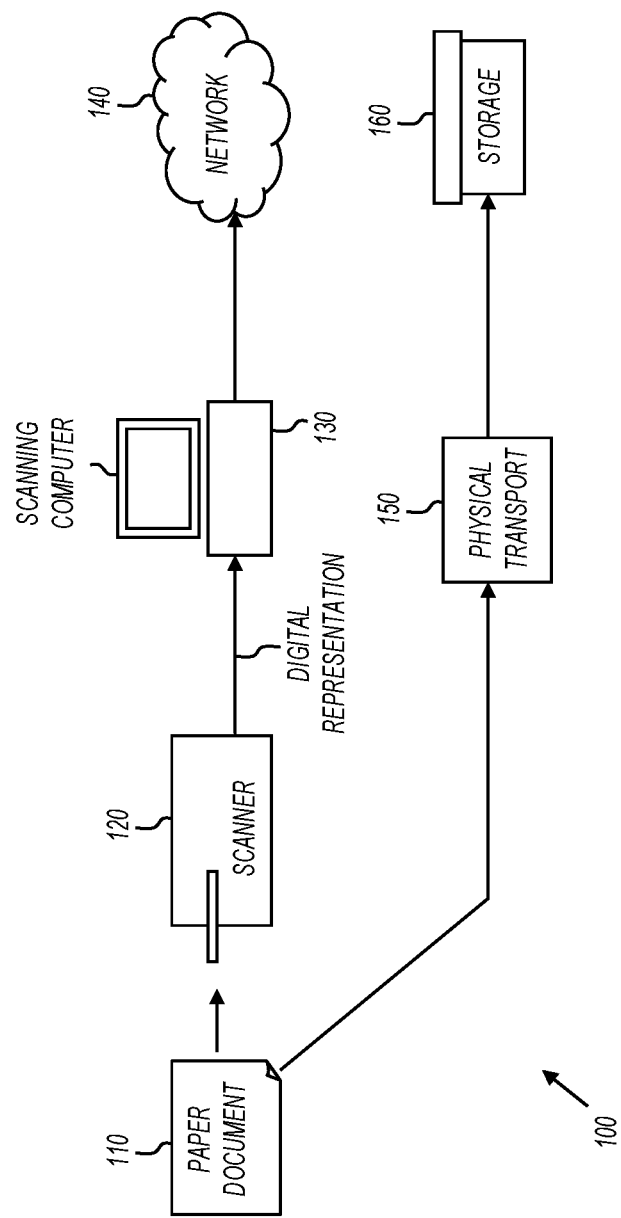
FIG. 1 shows a prior art document or contract acceptance system in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
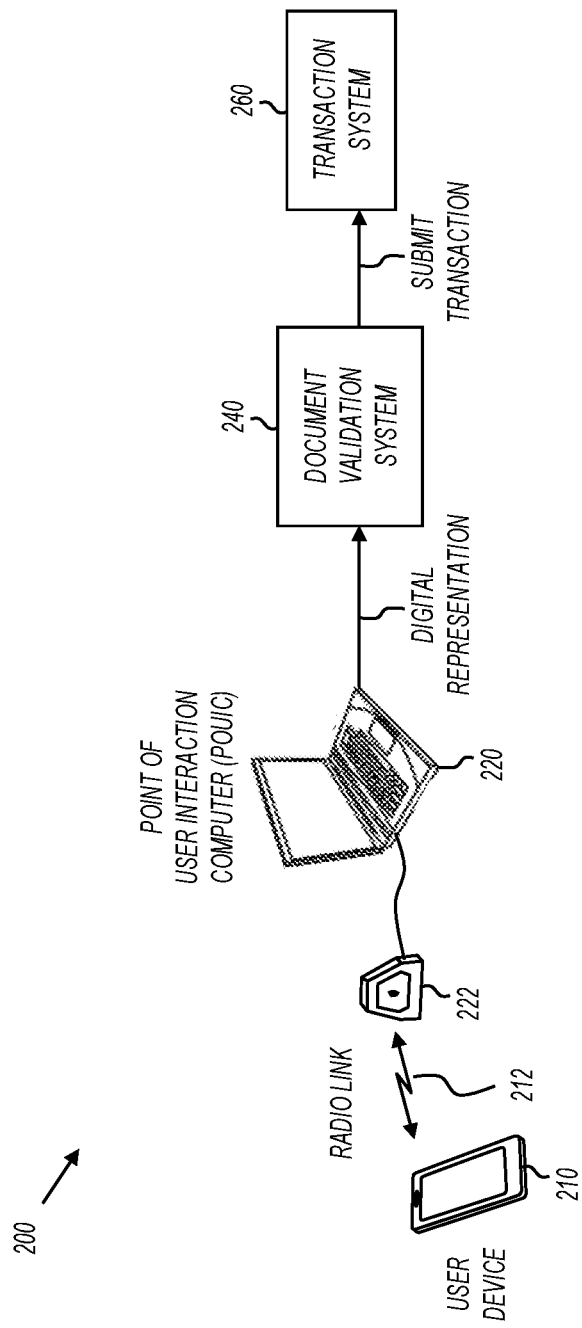
FIGS. 2-4 show document or contract acceptance systems in accordance with various embodiments of the present invention.
Figure 3:
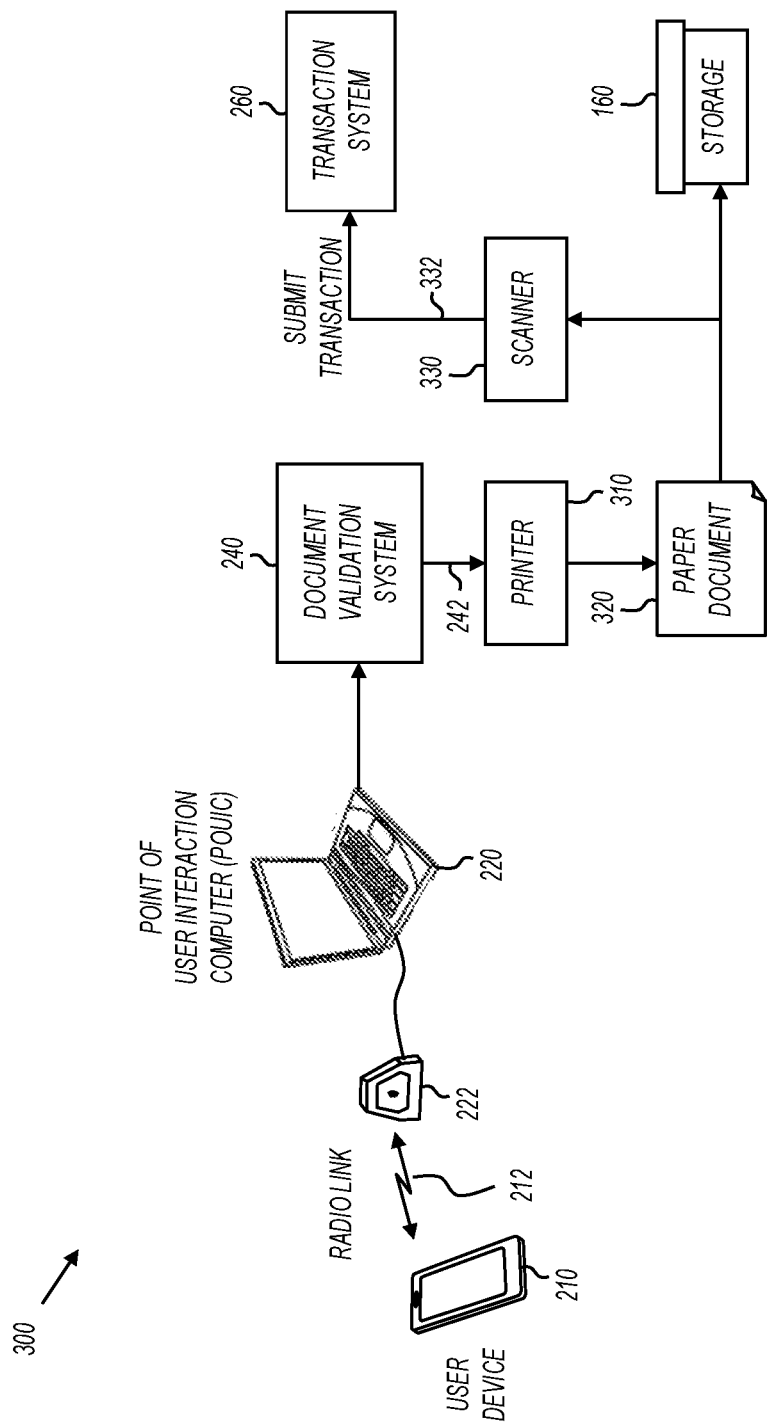
Figure 4:
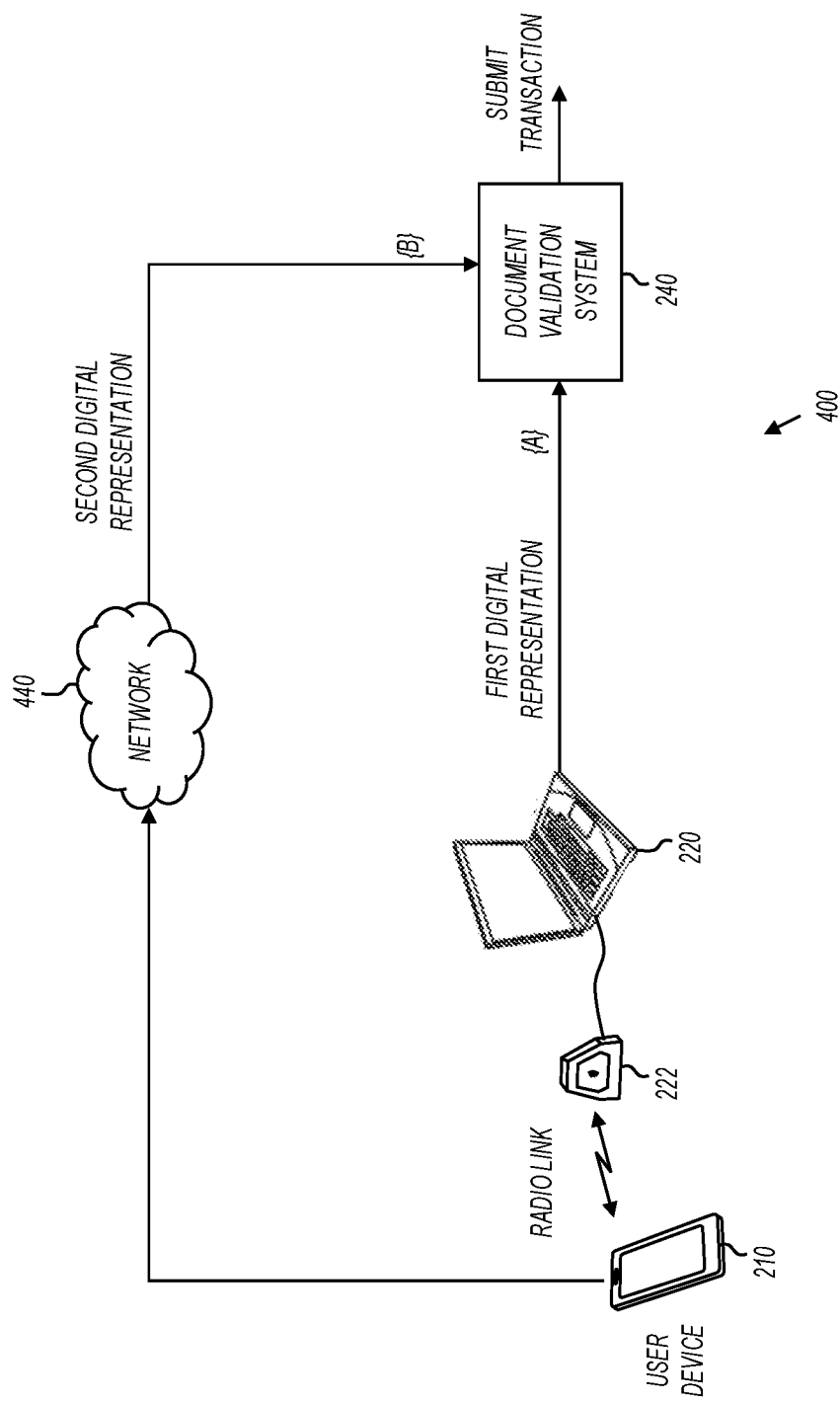

FIGS. 2-4 show document or contract acceptance systems in accordance with various embodiments of the present invention. Referring to FIG. 2, document or contract acceptance system 200 includes user device 210, interaction device 222, point-of-user-interaction computer (POUIC) 220, document or contract validation system 240, and transaction system 260.

User device 210 communicates with interaction device 222 over radio link 212. User device 210 may be any electronic device capable of communicating over radio link 212. For example, user device 210 may be a smartphone, tablet, personal computer, laptop, phablet, mobile phone, or the like.

In some embodiments, the radio link 212 is a near-field radio link and in other embodiments, the radio link 212 is a non-near-field radio link. For example, radio link 212 may be a BLUETOOTH™ radio link (non-near-field), or may be a near field communications (NFC) radio link (near-field) such as an ISO 14443 compatible radio link, an ISO 18092 compatible radio link, or an IEEE 802.15.4 compatible radio link.

As used herein, the term "near-field" refers to communication protocols and compatible radios in which the maximum intended communication distance is less than the wavelength of the radio wave used for that communication. ISO 14443 (NFC) is an example of near-field because the wavelength is on the order of 870 inches and the intended communication distance is only a few inches. All communications protocols and compatible radios that are not near-field are referred to herein as "non-near-field." An example of a non-near-field protocol is BLUETOOTH™ because the wavelength is on the order of 4.5 inches and the intended communication distance is typically much greater than 4.5 inches. The use of the term "non-near-field radio" is not meant to imply that the distance of communication cannot be less than the wavelength for the non-near-field radio.

Interaction device 222 may be any device capable of communicating over radio link 212 and also communicating with POUIC 220. For example, in some embodiments, interaction device 222 may be an NFC communication device, a BLUETOOTH communication device, or the like. In some embodiments, interaction device 222 is coupled to POUIC 220 using a wired connection, such as a universal serial bus (BUS) connection, and in other embodiments, interaction device 222 is coupled to POUIC 220 over a wireless connection. In still other embodiments, interaction device 222 is included within, and as a part of, POUIC 220. These and other embodiments are further described below.

In operation, user device 210 provides digital information representing a paper document or contract to POUIC by communication with interaction device 222 over radio link 212. For example, in some embodiments, one or more parameters that describe a partial or complete paper document or contract are provided by user device 210 over radio link 212. Also for example, in some embodiments, a digitized or scanned version of a paper document or contract is communicated over radio link 212. Example documents represented by the transmission over radio link 212 may include voter ballots, negotiable instruments, legal documents, or the like.

Point-of-user-interaction computer 220 receives the information provided by user device 210, and provides a digital representation of the paper document or contract to document or contract validation system 240. POUIC 220 may be any computer, server, or other electronic device capable of communicating with user device 210 via interaction device 222 and also capable of communicating with document or contract validation system 240. Examples include, but are not limited to, a voting machine, a point-of-sale terminal, an automated teller machine (ATM), or the like. In some embodiments, POUIC 220 could be a mobile phone or tablet or phablet. In some embodiments, POUIC 220 and interaction device 222 may be in one combined device.

Document or contract validation system 240 receives the digital representation of the document or contract and validates the document or contract before submitting the document or contract as a "transaction" to transaction system 260. Various methods and apparatus used for document or contract validation are described further below. The term "transaction" as used herein refers to the processing of accepting and/or operating on a validated document. For example, a transaction may include tallying votes on a validated ballot, or the acceptance of a point-of-sale transaction.

Document or contract validation system (DVS) 240 may validate the digital representation of the paper document or contract using one or more criteria. For example, in some embodiments, DVS 240 may compare the digital representation with other information received out-of-band (not shown in FIG. 2) to validate the document. Also in some embodiments, DVS 240 may query either POUIC 220 and/or user device 210 for additional information that may be useful for validation purposes. For example, DVS 240 may query user device 210 and/or POUIC 220 for location information that may be used to determine that user device 210 and POUIC 220 were in reasonably close proximity when user device 210 provided document or contract information over radio link 212. Also for example, DVS 240 may query a user of user device 210 with a direct question asking whether the user initiated the transaction. These and other embodiments of document or contract validation are described further below.

Referring to FIG. 3, document or contract acceptance system 300 includes user device 210, interaction device 222, POUIC 220, DVS 240, transaction system 260, and document or contract storage 160, all of which are described above with reference to previous figures. Document or contract acceptance system 300 also includes printer 310, paper document or contract 320, and scanner 330. In embodiments represented by FIG. 3, DVS 240 validates the digital representation of the document or contract and then prints paper document or contract 320 using printer 310. Paper document or contract 320 is then scanned by scanner 330 and stored at document or contract storage 160. The scanned version of the paper document or contract at 332 is then submitted to transaction system 260.

The physical locations of printer 310, scanner 330, and storage 160 are not limitations of various embodiments of the present invention. For example, in some embodiments, printer 310 and scanner 330 are collocated with DVS 240, and the scanned version of the document or contract at 332 is transmitted to transaction system 260 at a different location. Also for example, in some embodiments, printer 310 and scanner 330 are collocated with transaction system 260, and a digital representation of the document or contract at 242 is transmitted to the location of the transaction system 260 where the document or contract is printed, scanned, and submitted as a valid transaction.

Referring to FIG. 4, document or contract acceptance system 400 includes user device 210, interaction device 222, POUIC 220, and DVS 240. In embodiments represented by FIG. 4, a first digital representation {A} is received by DVS 240 from a communications channel that includes POUIC 220, and a second digital representation {B} is received by DVS 240 from a communications channel (network 440) that does not include POUIC 220. In some embodiments, both {A} and {B} originate from user device 210.

Network 440 may include any communication path that does not include POUIC 220. For example, network 440 may include a cellular telephone network to which user device 210 is able to connect and communicate. Also for example, network 440 may include a wireless network to which user device 210 is able to connect and communicate.

In some embodiments, user device 210 communicates with interaction device 222 by transmitting a digital representation of a document, and then also communicates with DVS 240 by transmitting a second digital representation of a document. Each of these communications may be initiated by user device 210, or may be initiated by POUIC 220 and/or DVS 240, in any combination. For example, user device 210 may initiate and transmit a digital representation of a voter ballot to POUIC 220, and at a later time may initiate and transmit a second digital representation of the voter ballot to DVS 240. Also for example, user device 210 may initiate and transmit a digital representation of a voter ballot to POUIC 220, and at a later time DVS may initiate communications with user device 210 and request a second digital representation of the voter ballot be transmitted.

In some embodiments, {A} and {B} represent parameters that describe the document. For example, in some embodiments, document or contract validation system 240 may validate voter ballots, {A} may include $a_1, a_2, \ldots a_n$, and {B} may include $b_1, b_2, \ldots b_n$, where $a_1$ and $b_1$ represent a voter identification, $a_2$ and $b_2$ represent a particular vote, and the remaining parameters represent additional document or contract properties that, when taken together, represent the completed ballot. In other embodiments, document or contract validation system 240 may validate point-of-sale documents, where $a_1$ and $b_1$ represent a buyer identification, $a_2$ and $b_2$ represent a bank routing number, and the remaining parameters represent additional document or contract properties that, when taken together, represent a negotiable instrument such as a bank draft or check. In other embodiments the POUIC 220 maybe a portable point-of-sale device or simply a device for sending a negotiable instrument to be received.

In some embodiments, {B} is sent by user device 210 to POUIC 220 and {A} is constructed from the user device's {B}. Since user device 210 may send some or part of {A} to the POUIC as {B}, {B} may be a subset of {A}. Further, in some embodiments, user device 210 may withhold certain information like its GPS location for POUIC 220 to report its location. Many different relationships between {A} and {B} are possible without departing from the scope of the present invention. Various examples are shown in FIG. 5.

Figure 5:
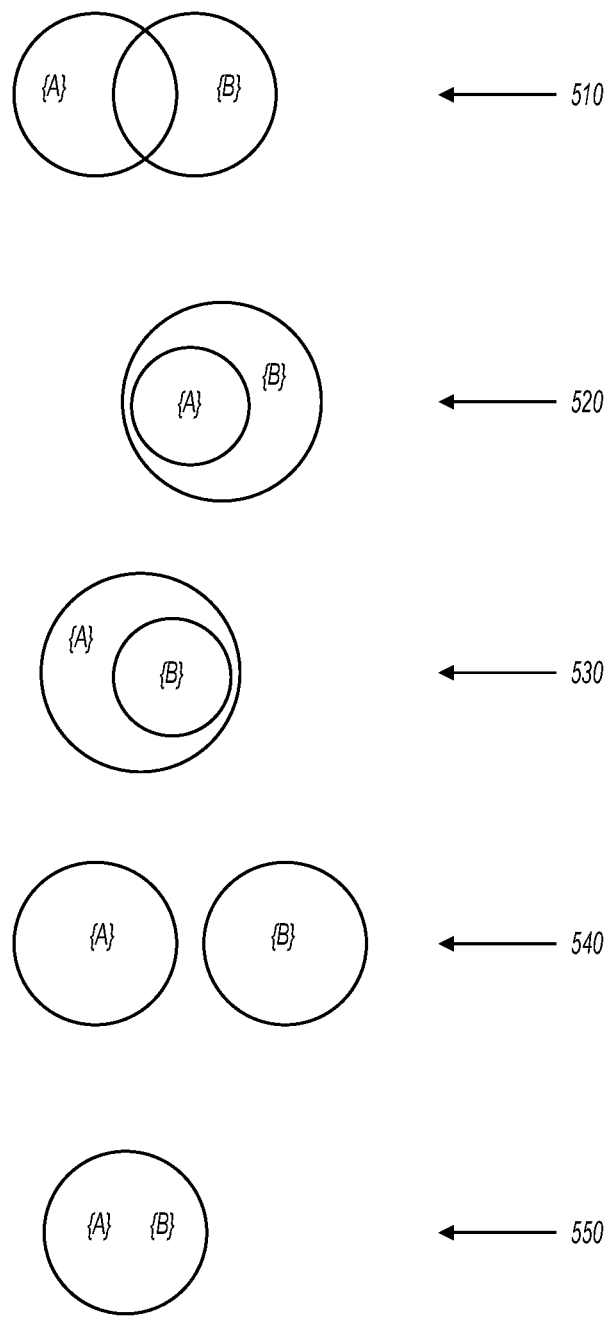
FIG. 5 shows document or contract parameter relationships in accordance with various embodiments of the present invention.

FIG. 5 shows document or contract parameter relationships in accordance with various embodiments of the present invention. Diagram 510 illustrates embodiments in which the sets of parameters {A} and {B} intersect. Diagram 520 illustrates embodiments in which the set of parameters {A} is a subset of the set of parameters {B}. Diagram 530 illustrates embodiments in which the set of parameters {B} is a subset of the set of parameters {A}. Diagram 540 illustrates embodiments in which the sets of parameters {A} and {B} do not intersect. And diagram 550 illustrates embodiments in which the sets of parameters {A} and {B} are the same.

Referring now back to FIG. 4, in operation DVS 240 receives {A} and {B} and performs operations to validate the document or contract and subsequently submit it as a valid transaction. In some embodiments, each parameter within {A} and {B} is compared directly, and the document or contract is validated when all parameters match, e.g., if $$a_1 = b_1,$$
$$a_2 = b_2,$$
$$\vdots$$
$$a_n = b_n,$$

then {A}={B} and the document or contract may be considered validated.

In some embodiments, some data may be missing, say $b_2$. In these embodiments, less than all parameters may be compared directly, e.g., $$a_1 = b_1,$$
$$a_2 =,$$
$$\vdots$$
$$a_n = b_n,$$

in which case, document or contract validation system 240 may or may not consider the document or contract valid based on rules that may be implementation specific. For example, if a bank check is missing a routing number, it may be considered invalid, but if it is missing a check number, it may still be found valid.

In some embodiments, a weighted error function is evaluated to compare {A} and {B}, e.g., $$Error = \frac{1}{n}\sqrt{w_1(a_1-b_1)^2 + w_2(a_2-b_2)^2 + \ldots w_n(a_n-b_n)^2}$$

or more generally, $$Error = f((a_1,b_1,w_1),(a_2,b_2,w_2), \ldots (a_n,b_n,w_n)).$$

In some embodiments, the error value may be compared to a threshold, and the document or contract is considered validated when the error is below the threshold.

Figure 6:
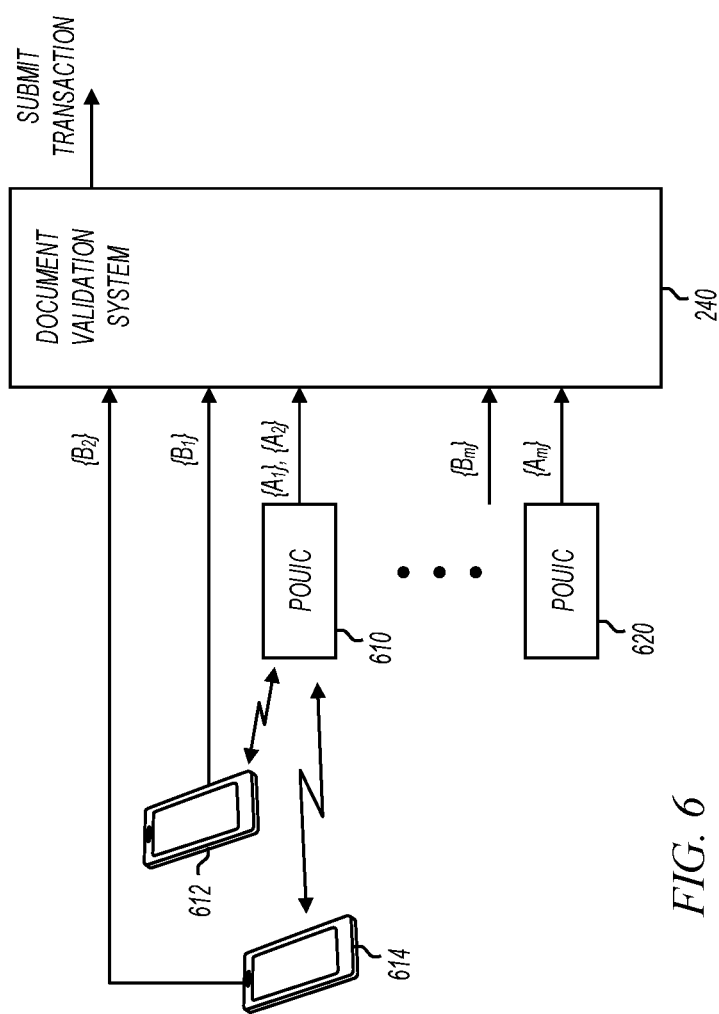
FIG. 6 shows a document or contract acceptance system in accordance with various embodiments of the present invention.

FIG. 6 shows a document or contract acceptance system in accordance with various embodiments of the present invention. In embodiments represented by FIG. 6, multiple user devices may interact with each POUIC. For example, POUIC 610 is shown interacting with user device 612 and user device 614. Also in embodiments represented by FIG. 6, multiple POUICs may interact with document or contract validation system 240. For example, POUIC 610 and POUIC 620 are both shown interacting with document or contract validation system 240. Any number of user devices may interact with each POUIC, and any number of POUICs may interact with document or contract verification system 240 without departing from the scope of the present invention.

Embodiments represented by FIG. 6 result in multiple document or contract parameter sets {A} being transmitted from each POUIC, and multiple document or contract parameter sets {B} being received by document or contract validation system 240 from the various user devices. For example, {A}={{A_1}, {A_2}, {A_3}, . . . {A_m}} and {B}={{B_1}, {B_2}, {B_3}, . . . {B_m}}, where {A_1} may include parameters $\{a_{11}, a_{12}, \ldots a_{1n}\}$, {B_1} may include parameters $\{b_{11}, b_{12}, \ldots b_{1n}\}$, {A_m} may include parameters $\{a_{m1}, a_{m2}, \ldots a_{mn}\}$, and {B_m} may include parameters $\{b_{m1}, b_{m2} \ldots b_{mn}\}$ where each parameter set includes n parameters.

In some embodiments, document or contract validation system 240 receives the document or contract parameter sets asynchronously and orders the received parameter sets {A} and {B} based on one or more criteria. For example, the parameter sets may be ordered based on timestamps, user device identifier, user identifier, user device location, POUIC location, or any combination.

After m parameter sets are ordered to match {A_1} with {B_1}, {A_2} with {B_2}, etc., the parameter sets may be compared to validate the various documents.

In some embodiments, for each {A_i} in {A} and each {B_i} in {B} where i=1 to m, the document or contract validation system evaluates an error function. The mismatch can be based on one or many values in the set {A_i} and {B_i}. The error function may be expressed generally as $$Error_i = f_i\left(\sum_{j=1}^{n} f_{ij}(a_{ij}, b_{ij}, w_{ij})\right)$$

where, for example, $f_i$ calculates an average weighted sum of the mismatch, and $f_{ij}$ calculates an error value between $a_{ij}$ and $b_{ij}$ with a given weighting of $w_{ij}$.

In some embodiments, $f_{ij}$ may be a numerical value resulting from weighting the squared difference between $a_{ij}$ and $b_{ij}$, e.g., $$f_{i1} = w_1 * (a_{i1} - b_{i1})^2$$

where i is the $i^{th}$ document or contract and $a_{i1}$ and $b_{i1}$ are the first parameter from the POUIC and user device respectively for the $i^{th}$ document.

$f_{ij}$ may also be a more complex function. For example, because a GPS location of a user device may not be exactly the GPS location of the POUIC, a function to evaluate whether the location matches may include a function to convert an address to a GPS location and then compare two GPS locations. Also, in some embodiments, $f_{ij}$ could be nonmathematical function, such as a look up table.

In some embodiments, some parameters may be weighted more heavily than others. For example, if $a_{i1}$ and $b_{i1}$ need to match exactly, while $a_{i2}$ and $b_{i2}$ need not, then $w_1$ may be made greater than $w_2$.

In some embodiments, if {A_i} does not include some entry but {B_i} does, then the POUIC may send a notification for digital validation (yes or no) to the user device to confirm the value of an entry in {A_i}. The opposite is also possible. A yes may imply that particular match may be considered perfect. It is also possible that yes may be enough to not need any other matching. A no or no answer may change the weights of other parameters to be matched.

{A} represents data via the direct path between the User Device (Start Node) and the DVS (Destination Node) and the {B} represents the data via indirect path between the User Device (Start Node) and the DVS (Destination Node) through the POUIC (Indirect Node). It is important to note that both the direct and indirect paths are equally important to demonstrate that the sender using the User Device was in fact interacting with the recipient using the POUIC to effect a transaction after the DVS between the sender and the recipient. The loopback from the destination node to the originating node for confirmation is an additional factor of validation that could be used by the DVS.

There are various possible combinations of direct and indirect paths and similarly loop backs that will accomplish the same objective of verified trust between the parties involved. These are described next.

Figure 7:
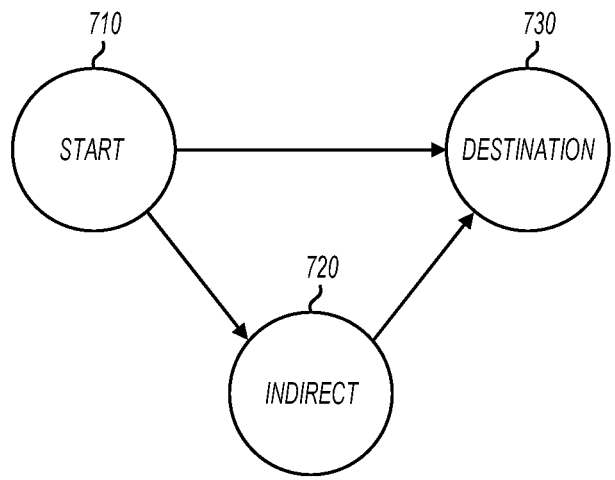
FIGS. 7 and 8 show transaction nodes in accordance with various embodiments of the present invention.
Figure 8:
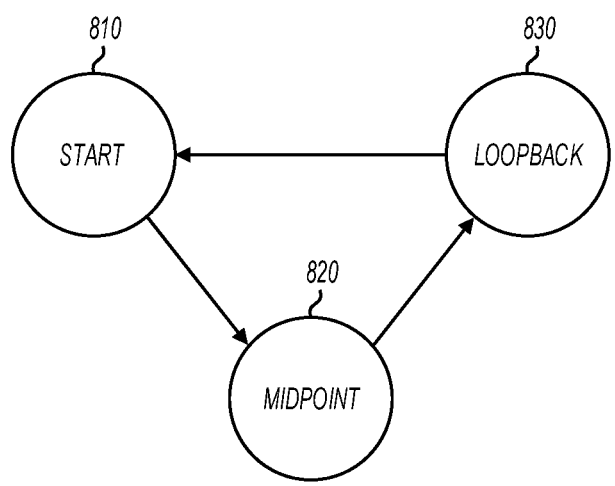

FIGS. 7 and 8 show transaction nodes in accordance with various embodiments of the present invention. FIG. 7 shows start node 710, indirect node 720, and destination node 730. The data flow between the various nodes on FIG. 7 represents a flow of data that eventually leads to the validation of a document. The data flowing between nodes may be document or contract parameters as described above, or may be any other data that may lead to document or contract validation. In embodiments represented by FIG. 7, there is one direct relationship between two nodes, the start node and the destination node, and one indirect relationship between the same two nodes with an indirect node in the middle. This process allows all nodes to establish a trusted relationship with each other by comparing, combining, or generally processing the direct path data packets with the indirect path data packets.

Various groupings exist in which the user device, the POUIC, and document or contract validation system take on the different roles of start node, indirect node, and destination node. These groupings and associated embodiments are summarized in the following table.

TABLE 1

| Grouping | Start Node | Destination Node | Indirect Node |
|---|---|---|---|
| 1A | User Device | DVS | POUIC |
| 1B | User Device | POUIC | DVS |
| 1C | POUIC | User Device | DVS |
| 1D | POUIC | DVS | User Device |
| 1E | DVS | User Device | POUIC |
| 1F | DVS | POUIC | User Device |

In grouping 1A in Table 1, the user device sends data directly to the DVS, and sends data indirectly to the DVS through the POUIC. This corresponds to embodiments described above with reference to earlier figures. In some embodiments, the data may be document or contract parameters {A} and {B}, and in other embodiments, the data may be other than document or contract parameters. For example, in some embodiments, the data sent indirectly to the DVS through the POUIC may be encrypted data, and the data sent directly from the user device to the DVS may be a decryption key. In these embodiments a trusted relationship is formed when the DVS successfully decrypts the data received from the POUIC using the decryption key received from the user device.

In grouping 1B in Table 1, the user device sends data directly to the POUIC, and sends data indirectly to the POUIC through the DVS. In some embodiments, the data may be document or contract parameters {A} and {B}, and in other embodiments, the data may be other than document or contract parameters. For example, in some embodiments the user device may send partial identity information to the POUIC directly. The user device may then send the remaining identity information to the POUIC indirectly via the DVS. The POUIC combines the information, which eventually leads to a trusted transaction.

In grouping 1C in Table 1, the POUIC sends data directly to the user device, and sends data indirectly to the user device through the DVS. In some embodiments, the data may be document or contract parameters {A} and {B}, and in other embodiments, the data may be other than document or contract parameters. For example, in some embodiments, the POUIC sends partial or full transaction information it wants to get approval for to the user device directly. The POUIC may also send the rest or the same transaction information indirectly to the user device via the DVS, which then leads to an eventual trusted transaction.

In grouping 1D in Table 1, the POUIC sends data directly to the DVS, and sends data indirectly to the DVS through the user device. In some embodiments, the data may be document or contract parameters {A} and {B}, and in other embodiments, the data may be other than document or contract parameters. For example, in some embodiments, the POUIC may send partial or full transaction information it wants to get approval for to the user device directly. The POUIC may also send the rest or the same transaction information indirectly to the user device via the DVS, which then leads to an eventual trusted transaction.

In grouping 1E in Table 1, the DVS sends data directly to the user device, and sends data indirectly to the user device through the POUIC. In some embodiments, the data may be document or contract parameters {A} and {B}, and in other embodiments, the data may be other than document or contract parameters. For example, in some embodiments, the DVS may send a transaction identity to the user device directly. The DVS may also send a transaction identity verifier to the user device via the POUIC indirectly. The user device may then verify if the transaction identity verifier represents the transaction identity. This then leads to an eventual trusted transaction.

In grouping 1F in Table 1, the DVS sends data directly to the POUIC, and sends data indirectly to the POUIC through the user device. In some embodiments, the data may be document or contract parameters {A} and {B}, and in other embodiments, the data may be other than document or contract parameters. For example, in some embodiments, the DVS may send a partial code to the POUIC directly and the remaining code comes to the POUIC from the DVS via the user device. The POUIC combines that information to submit for an eventual transaction.

FIG. 8 shows start node 810, midpoint node 820, and loopback node 830. The data flow between the various nodes on FIG. 8 represents a flow of data that eventually leads to the validation of a document. The data flowing between nodes may be document or contract parameters as described above, or may be any other data that may lead to document or contract validation. In embodiments represented by FIG. 8, each node has a direct relationship and an indirect relationship with each other node. For example, start node 810 has a direct relationship with midpoint node 820, and also has an indirect relationship with midpoint node 820 through loopback node 830. This process allows all nodes to establish a trusted relationship with each other by comparing, combining, or generally processing the direct path data packets with the indirect path data packets.

Various groupings exist in which the user device, the POUIC, and document or contract validation system take on the different roles of start node, midpoint node, and loopback node. These groupings and associated embodiments are summarized in the following table.

TABLE 2

| Grouping | Start Node | Midpoint Node | Loopback Node |
|---|---|---|---|
| 2A | User Device | POUIC | DVS |
| 2B | User Device | DVS | POUIC |
| 2C | POUIC | User Device | DVS |
| 2D | POUIC | DVS | User Device |
| 2E | DVS | User Device | POUIC |
| 2F | DVS | POUIC | User Device |

In each of the groupings shown in Table 2, the start node may send encrypted data representing a transaction to the midpoint node while sending the decryption key to the loopback node. The midpoint node may augment additional encrypted information (while sending decryption key directly to the start node) and sends on this augmented information to the loopback node. The loopback node verifies the data received from the start node, augments its own encrypted data, and sends the augmented data to the start node which then verifies if the midpoint data packet and the loopback data packet are verifiable. At the end of this process as an example all three nodes have a trusted relationship.

In some embodiments, the data flow between nodes includes packets of data that are communicated directly and indirectly, which eventually lead to the DVS determining if a document or contract can be validated. In some embodiments, a combination of processes may be performed by the various nodes to complete the document or contract validation process. In some embodiments, the decryption key may be a public key, a private key, a symmetric key or any other key that is useful for a decryption process. The decryption process may also be "keyless" or implied key.

Figure 9:
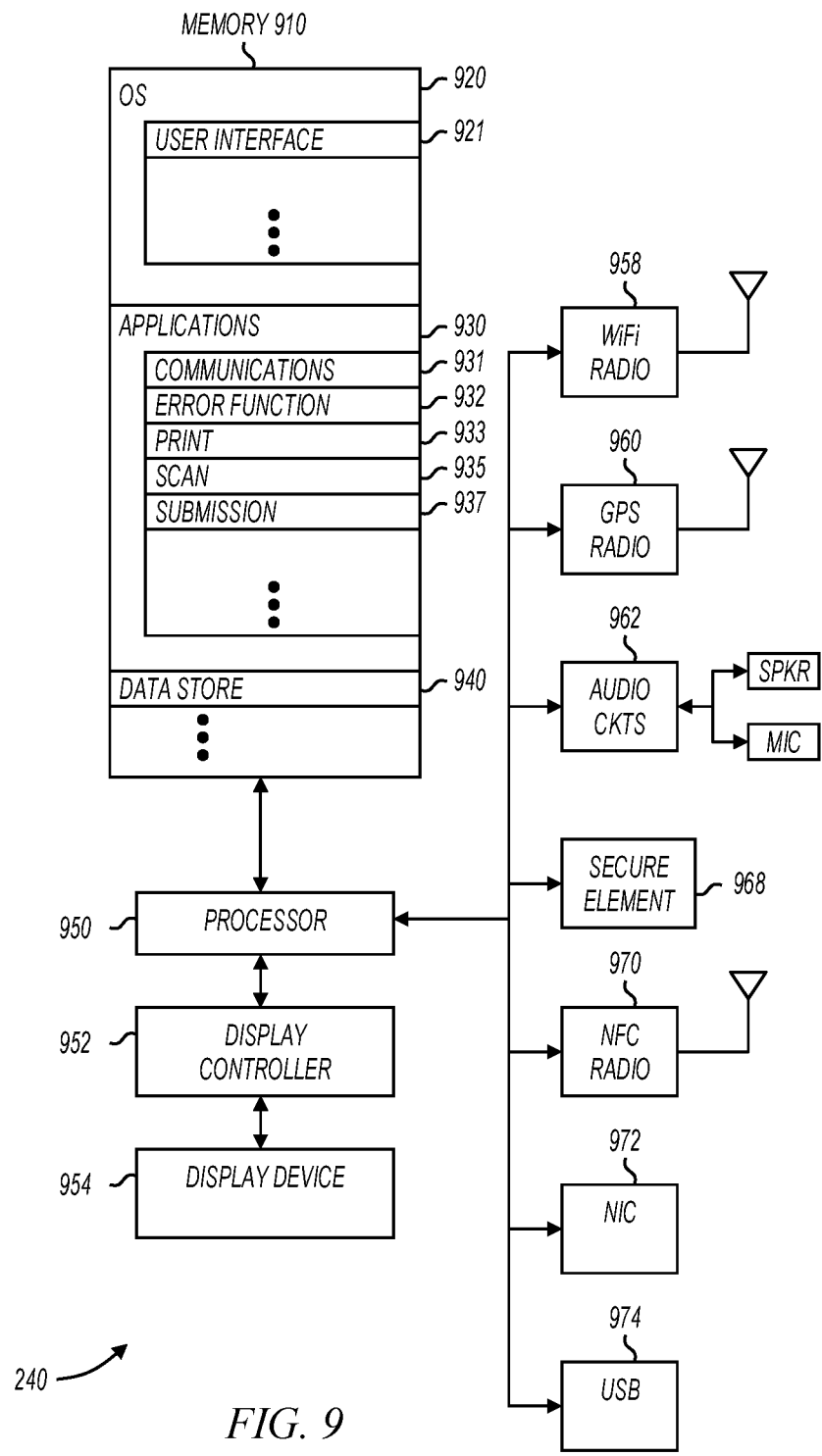
FIG. 9 shows a block diagram of a document or contract validation system in accordance with various embodiments of the present invention.

FIG. 9 shows a block diagram of a document or contract validation system in accordance with various embodiments of the present invention. Document or contract validation system 240 includes processor 950, memory 910, display controller 952, display device 954, Wi-Fi radio 958, GPS radio 960, audio circuits 962, secure element 968, near field communications (NFC) radio 970, network interface controller (NIC) 972, and universal serial bus (USB) device 974. Document or contract validation system 240 represents any type of computer, server, or the like, capable of performing as described herein. For example, in some embodiments, document or contract validation system 240 may be a computer that is collocated with a point-of-user-interaction computer, or a computer that is collocated with a transaction system.

Processor 950 may be any type of processor capable of executing instructions stored in memory 910 and capable of interfacing with the various components shown in FIG. 9. For example, processor 950 may be a microprocessor, a digital signal processor, an application specific processor, or the like. In some embodiments, processor 950 is a component within a larger integrated circuit such as a system on chip (SOC) application specific integrated circuit (ASIC).

Display controller 952 provides an interface between processor 950 and display device 954. In some embodiments, display controller 952 is integrated within processor 950, and in other embodiments, display controller 952 is integrated within display device 954.

Display device 954 is an output device capable of presenting information for visual, audible, or tactile reception. Examples include, but are not limited to, analog electronic displays, digital displays, monitor displays, and the like. Further, in some embodiments, display device 954 may include a touch sensitive surface, sensor, or set of sensors that accept input from a user. For example, display device 954 may detect when and where an object touches the screen, and may also detect movement of an object across the screen. When touch sensitive display device detects input, display controller 952 and processor 950 (in association with user interface component 921) may determine whether a gesture is to be recognized.

Display device 954 may be manufactured using any applicable display technologies, including for example, liquid crystal display (LCD), active matrix organic light emitting diode (AMOLED), and the like. Further, display device 954 may be manufactured using any application touch sensitive input technologies, including for example, capacitive and resistive touch screen technologies, as well as other proximity sensor technologies.

Wi-Fi radio 958 is a wireless device capable of connecting to a wireless access point and allows for the connectivity on to a wireless network using IEEE 802.11 networking standards. In some embodiments Wi-Fi radio 958 is omitted.

Audio circuits 962 provide an interface between processor 950 and audio devices such as speakers and a microphone.

Secure element 968 provides secure information storage. In some embodiments, secure element 968 is a smartcard compatible secure element commonly found in credit card applications and/or security applications. Near-field radio 970 provides near field communications capability between document or contract validation system 240 and other devices nearby. In some embodiments, near-field radio 970 may be an ISO 14443 compatible radio operating at 13.56 megahertz, although this is not a limitation of the present invention.

In some embodiments, secure element 968 is combined with near-field radio 970 in a single integrated circuit such as a smartcard controller. In other embodiments, secure element 968, or a combination of secure element 968 and near-field radio 970 are integrated into another semiconductor device such as processor 950.

Examples of smart card controllers that combine secure element 968 with near field radio 970 are the "SmartMX" controllers sold by NXP Semiconductors N.V. of Eindhoven, The Netherlands. In some embodiments, the secure element has an ISO/IEC 7816 compatible interface that communicates with other components within document or contract validation system 240 (e.g., processor 950), although this is not a limitation of the present invention.

In some embodiments, secure element 968 includes applets, keys and digital certificates. Digital certificates are used to validate the identity of the certificate holder. Certificate authorities typically issue digital certificates. Digital certificates and their functionality are well known. Secure element applets and encryption keys are also well known. In some embodiments, document or contract validation system 240 makes available one or more of applets, keys, and/or digital certificates to create a trusted relationship with either or both of a user device and/or a POUIC to validate a document.

NIC 972 may include any interface device capable of communicating over a network. For example, NIC 972 may be include a data port such as an Ethernet port. USB device 974 may be any device that includes USB functionality. USB device 974 may be combined with NIC 972 to provide network communications.

Document or contract validation system 240 may also include many other circuits and services that are not specifically shown in FIG. 9. Any number and/or type of circuits and services may be included within document or contract validation system 240 without departing from the scope of the present invention.

Memory 910 may include any type of memory device. For example, memory 910 may include volatile memory such as static random access memory (SRAM), or nonvolatile memory such as FLASH memory. Memory 910 is encoded with (or has stored therein) one or more software modules (or sets of instructions), that when accessed by processor 950, result in processor 950 performing various functions. In some embodiments, the software modules stored in memory 910 may include an operating system (OS) 920 and applications 930. Applications 930 may include any number or type of applications. Examples provided in FIG. 9 include a communications application 931, an error function application 932, a printing application 933, a scanning application 935, and a submission application 937. Memory 910 may also include any amount of space dedicated to data storage 940.

In some embodiments, one or more of applications 930 may cause processor 950 to perform operations on data and to interact with the various devices shown in FIG. 9. Examples follow.

Operating system 920 may be a mobile device operating system such as an operating system to control a tablet computer, laptop computer, server. or the like. As shown in FIG. 9, operating system 920 includes a user interface component 921. Operating system 920 may include many other components without departing from the scope of the present invention.

User interface component 921 includes processor instructions that cause processor 950 to display menus, move icons, and manage other portions of the display environment.

Communications application 931 includes processor instructions that cause processor 950 to communicate using one or more of the radios, NIC 972, USB device 974, or any other included device capable of providing network communications. In some embodiments, communications application 931 causes a first set of document or contract parameters to be received from a communications channel that includes a point-of-user-interaction computer, and to receive a second set of document or contract parameters from a communications channel that does not include a point-of-user-interaction computer.

Error function application 932 includes processor instructions that cause processor 950 to evaluate an error function. For example, error function application 932 may evaluate a weighted comparison between a first set of document or contract parameters {A} received through a first communications channel that includes a POUIC, and a second set of document or contract parameters {B} received through a second communications channel that does not include a POUIC. In some embodiments, error function application 932 also compares the computed error value against a threshold to conditionally validate the document.

Print application 933 includes processor instructions that cause processor 950 to print the document or contract represented by the document or contract parameters {A} and {B}. Similarly, scan application 935 includes processor instructions that cause processor 950 to scan the document or contract printed by print application 933. Submission application 937 includes processor instructions that cause processor 950 to submit the validated document or contract as a valid transaction. In some embodiments, submission application submits one set of document or contract properties (e.g., {A} or {B}), and in other embodiments, submission application submits a combination of {A} and {B} as the validated document. In still further embodiments, the scanned representation of the printed document or contract is submitted to a transaction system as a validated document.

Each of the above-identified applications corresponds to a set of instructions for performing one or more functions described above. These applications (sets of instructions) need not be implemented as separate software programs, procedures or modules, and thus various subsets of these applications may be combined or otherwise re-arranged in various embodiments. For example, error function application 932 may be combined with submission application 937. Furthermore, memory 910 may store additional applications (e.g., video players, camera applications, etc.) and data structures not described above.

It should be noted that system 240 is presented as an example of a computing device, and that system 240 may have more or fewer components than shown, may combine two or more components, or may have a different configuration or arrangement of components. For example, document or contract validation system 240 may include many more components such as sensors (optical, touch, proximity etc.), or any other components suitable for use in a document or contract validation system.

Figure 10:
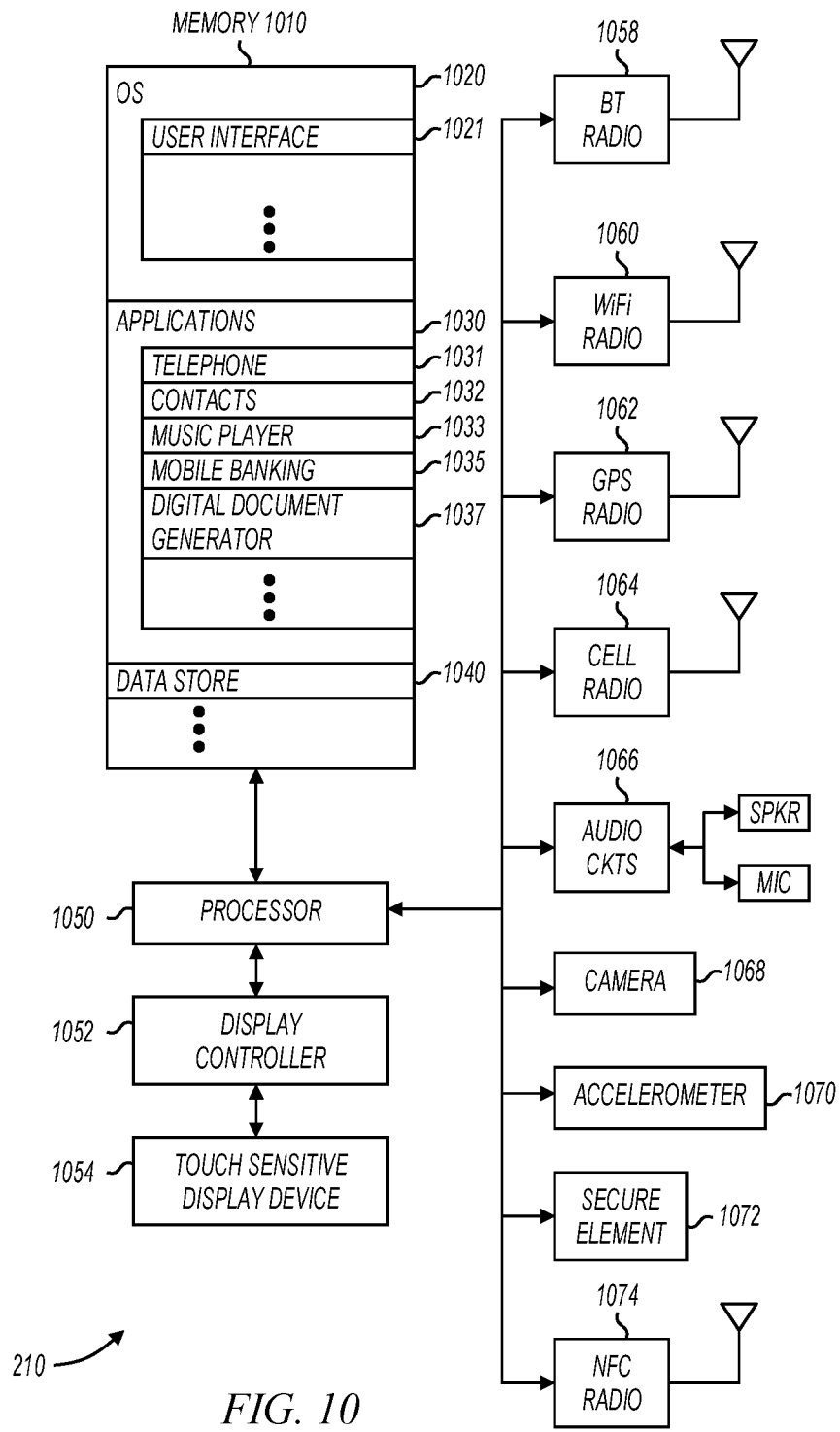
FIG. 10 shows a block diagram of a user device in accordance with various embodiments of the present invention.

FIG. 10 shows a block diagram of a user device in accordance with various embodiments of the present invention. User device 210 includes processor 1050, memory 1010, display controller 1052, touch sensitive display device 1054, Bluetooth radio 1058, WiFi radio 1060, GPS radio 1062, cellular radio 1064, audio circuits 1066, camera 1068, accelerometer 1070, secure element 1072, and near field communications (NFC) radio 1074. User device 210 may be any type of device that includes all or some of the components shown. For example, in some embodiments, user device 210 may be a cell phone, a smartphone, a tablet computer, a laptop computer, or the like.

Processor 1050 may be any type of processor capable of executing instructions stored in memory 1010 and capable of interfacing with the various components shown in FIG. 10. For example, processor 1050 may be a microprocessor, a digital signal processor, an application specific processor, or the like. In some embodiments, processor 1050 is a component within a larger integrated circuit such as a system on chip (SOC) application specific integrated circuit (ASIC).

Display controller 1052 provides an interface between processor 1050 and touch sensitive display device 1054. In some embodiments, display controller 1052 is integrated within processor 1050, and in other embodiments, display controller 1052 is integrated within touch sensitive display device 1054.

Touch sensitive display device 1054 is a display device that includes a touch sensitive surface, sensor, or set of sensors that accept input from a user. For example, touch sensitive display device 1054 may detect when and where an object touches the screen, and may also detect movement of an object across the screen. When touch sensitive display device 1054 detects input, display controller 1052 and processor 1050 (in association with user interface component 1021) determine the appropriate response. For example, in response to user input, applications may be started, icons may be moved, or document or contract parameters may be transmitted.

Touch sensitive display device 1054 may be manufactured using any applicable display technologies, including for example, liquid crystal display (LCD), active matrix organic light emitting diode (AMOLED), and the like. Further, touch sensitive display device 1054 may be manufactured using any application touch sensitive input technologies, including for example, capacitive and resistive touch screen technologies, as well as other proximity sensor technologies.

Bluetooth radio 1058 is a type of non-near field radio capable of communicating on a frequency between 2.402 GHz and 2.480 GHz. Bluetooth is an example of a non-near-field protocol because the wavelength is on the order of 4.5 inches and the intended communication distance is typically much greater than 4.5 inches. The use of the term "non-near-field radio" is not meant to imply that the distance of communication cannot be less than the wavelength for the non-near-field radio. Bluetooth radio 1058 is capable of communicating on a personal-area network (PAN) with other Bluetooth devices on the personal-area network. In some embodiments Bluetooth radio 1058 is omitted. In some embodiments, user device 210 uses Bluetooth radio 1058 to communicate document or contract properties such as document or contract properties {A} or {B}.

WiFi radio 1060 may be any type of radio capable of communicating over a wireless network. Examples include radios that are compatible with one or more of the Institute of Electrical and Electronics Engineers (IEEE) 802.11 standards. In some embodiments, WiFi radio 1060 is omitted. In some embodiments, user device 210 uses WiFi radio 1060 to communicate document or contract properties such as document or contract properties {A} or {B}.

GPS radio 1062 includes a global positioning system (GPS) receiver capable of determining the present location (e.g., latitude and longitude) of user device 210. In some embodiments, GPS radio 1062 is used to provide location information that is included as a document or contract property (e.g., a property in either {A} or {B}).

Cellular radio 1064 may be any type of radio that can communicate within a cellular network. Examples include, but are not limited to, radios that communicate using orthogonal frequency division multiplexing (OFDM), code division multiple access (CDMA), time division multiple access (TDMA), and the like. Cellular radio 1064 may operate at any frequency or combination of frequencies without departing from the scope of the present invention. In some embodiments, cellular radio 1064 is omitted.

Audio circuits 1066 provide an interface between processor 1050 and audio devices such as a speaker and microphone.

Camera 1068 may be any camera suitable for use in a mobile device. For example, camera 1068 may include a CMOS sensor with optics or any other type of image capture device at any resolution. Camera 1068 may be operated by a camera software application (not shown). Accelerometer 1070 detects motion of user device 210, and may be used by any software application.

Secure element 1072 provides secure information storage. In some embodiments, secure element 1072 is a smartcard compatible secure element commonly found in credit card applications and/or security applications. NFC radio 1074 provides near field communications capability between user device 210 and other devices nearby. In some embodiments, NFC radio 1074 may operate at 13.56 megahertz, although this is not a limitation of the present invention. In some embodiments, user device 210 uses NFC radio 1074 to communicate document or contract properties such as document or contract properties {A} or {B}.

In some embodiments, secure element 1072 is combined with NFC radio 1074 in a single integrated circuit such as a smartcard controller. In other embodiments, secure element 1072, or a combination of secure element 1072 and NFC radio 1074 are integrated into another semiconductor device such as processor 1050.

Examples of smart card controllers that combine secure element 1072 with NFC radio 1074 are the "SmartMX" controllers sold by NXP Semiconductors N.V. of Eindhoven, The Netherlands. In some embodiments, the secure element has an ISO/IEC 7816 compatible interface that communicates with other components within user device 210 (e.g., processor 1050), although this is not a limitation of the present invention. Further, in some embodiments, NFC radio 370 has an ISO/IEC 14443 contactless interface.

User device 210 may include many other circuits and services that are not specifically shown in FIG. 10. For example, in some embodiments, user device 210 may include an additional camera, haptic feedback devices, and the like. Any number and/or type of circuits and services may be included within user device 210 without departing from the scope of the present invention.

Memory 1010 may include any type of memory device. For example, memory 1010 may include volatile memory such as static random access memory (SRAM), or nonvolatile memory such as FLASH memory. Memory 1010 is encoded with (or has stored therein) one or more software modules (or sets of instructions), that when accessed by processor 1050, result in processor 1050 performing various functions. In some embodiments, the software modules stored in memory 1010 may include an operating system (OS) 1020 and applications 1030. Applications 1030 may include any number or type of applications. Examples provided in FIG. 10 include a telephone application 1031, a contacts application 1032, a music player application 1033, a mobile banking application 1035, and a digital document or contract generator application 1037. Memory 1010 may also include any amount of space dedicated to data storage 1040.

Operating system 1020 may be a mobile device operating system such as an operating system to control a mobile phone, smartphone, tablet computer, laptop computer, or the like. As shown in FIG. 10, operating system 1020 includes user interface component 1021. Operating system 1020 may include many other components without departing from the scope of the present invention.

User interface component 1021 includes processor instructions that cause user device 210 to display content on touch sensitive display device 1054, recognize user input, and to provide the user input to applications. User interface component 1021 also includes instructions to display menus, move icons, and manage other portions of the display environment.

Telephone application 1031 may be an application that controls a cell phone radio. Contacts application 1032 includes software that organizes contact information. Contacts application 1032 may communicate with telephone application 1031 to facilitate phone calls to contacts. Music player application 1033 may be a software application that plays music files that are stored in data store 1040.

Mobile banking application 1035 may be a software application that communicates with a banking service to allow banking functions such as balance inquiries, funds transfers, bill payment and the like. Mobile banking application 1035 may be a downloaded "thick" application, or may be a "thin" application that uses internet browser functionality. Other application examples include applications that store an identity such as a passport or a building access identity.

In some embodiments, mobile banking application 1035 includes processor instructions that allow user device 210 to perform mobile payments. For example, mobile banking application 1035 may include processor instructions that handle access to one or more payment instruments such as credit cards, debit cards, and pre-paid cards. In some embodiments, mobile banking application 1035 communicates with smartcard secure element 1072 and/or NFC radio 1074 within user device 210. For example, mobile banking application 1035 may store and access payment identities in smartcard secure element 1072 and allow proximity payments using NFC radio 1074.

Digital document or contract generator application 1037 is a software application that includes instructions that when executed allow user device 210 to produce a set of document or contract properties (e.g., {A} and/or {B}) that represent a document. For example, digital document or contract generator application 1037 may be a voting application that interacts with a user and allows the user to fill out a voter ballot. Upon completion of the voter ballot, digital document or contract generator application 1037 may then generate one or more sets of digital document or contract properties {A} or {B} that represent the document. Also for example, digital document or contract generator application 1037 may be a digital payments application that interacts with a user and allows the user to generate a digital representation of a negotiable instrument such as a bank draft or check. Upon completion of the negotiable instrument, digital document or contract generator application 1037 may then generate one or more sets of digital document or contract properties {A} or {B} that represent the document. Digital document or contract generator application 1037 may then transmit the one or more sets of digital document or contract properties using one or more of Bluetooth radio 1058, WiFi radio 1060, cellular radio 1064, NFC radio 1074, or the like.

Each of the above-identified applications correspond to a set of instructions for performing one or more functions described above. These applications (sets of instructions) need not be implemented as separate software programs, procedures or modules, and thus various subsets of these applications may be combined or otherwise re-arranged in various embodiments. For example, telephone application 1031 may be combined with contacts application 1032. Furthermore, memory 1010 may store additional applications (e.g., video players, camera applications, etc.) and data structures not described above.

It should be noted that device 210 is presented as an example of a user device, and that device 210 may have more or fewer components than shown, may combine two or more components, or may have a different configuration or arrangement of components. For example, user device 210 may include many more components such as sensors (optical, touch, proximity etc.), or any other components suitable for use in a mobile device.

Figure 11:
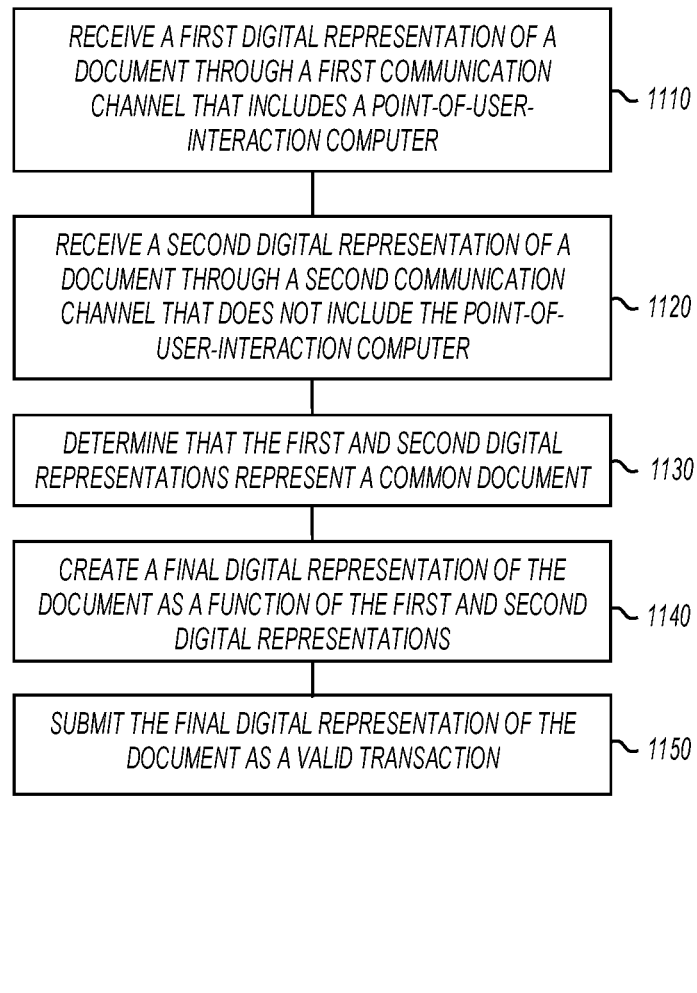
FIGS. 11 and 12 show flowcharts of methods in accordance with various embodiments of the present invention.

FIG. 11 shows a flowchart of methods in accordance with various embodiments of the present invention. In some embodiments, method 1100 may be performed by a document or contract validation system such as any of document or contract validation systems shown in, and described with reference to, previous figures. Further, in some embodiments, method 1100 may be performed by a processor that is executing software such as the various applications shown in FIG. 9. Method 1100 is not limited by the type of system or entity that performs the method. The various actions in method 1100 may be performed in the order presented, in a different order, or simultaneously. Further, in some embodiments, some actions listed in FIG. 11 are omitted from method 1100.

Method 1100 begins at 1110 in which a first digital representation of a document or contract is received through a first communication channel that includes a point-of-user-interaction computer. An example communications channel is shown in FIG. 4 in which document or contract properties are transmitted from user device 210 to POUIC 220 and to document or contract validation system 240 as first digital representation {A}. In some embodiments, the actions at 1110 are performed in response to processor 950 executing instructions in communications application 931 (FIG. 9).

At 1120, a second digital representation of a document or contract is received through a second communication channel that does not include a point-of-user-interaction computer. An example communications channel is shown in FIG. 4 in which document or contract properties are transmitted from user device 210 to document or contract validation system 240 through network 440 as second digital representation {B}. In some embodiments, the actions at 1120 are performed in response to processor 950 executing instructions in communications application 931 (FIG. 9).

At 1130, a determination is made that the first and second digital representations represent a common document. In some embodiments, an error function is evaluated, and the result is compared to a threshold to make the determination. Example error functions are described above with reference to previous figures.

At 1140, a final digital representation of the document or contract is created as a function of the first and second representations. In some embodiments, this corresponds to selecting either the first or the second digital representations, and in other embodiments, this corresponds to combining the first and second digital representations. In some embodiments, the final digital representation is created by printing a paper document or contract and scanning the paper document or contract to generate a scanned image.

At 1150, the final digital representation of the document or contract is submitted as a valid transaction. In some embodiments, this may correspond to submitting a voter ballot for vote tallying, and in other embodiments, this may correspond to submitting a negotiable instrument for settlement.

Figure 12:
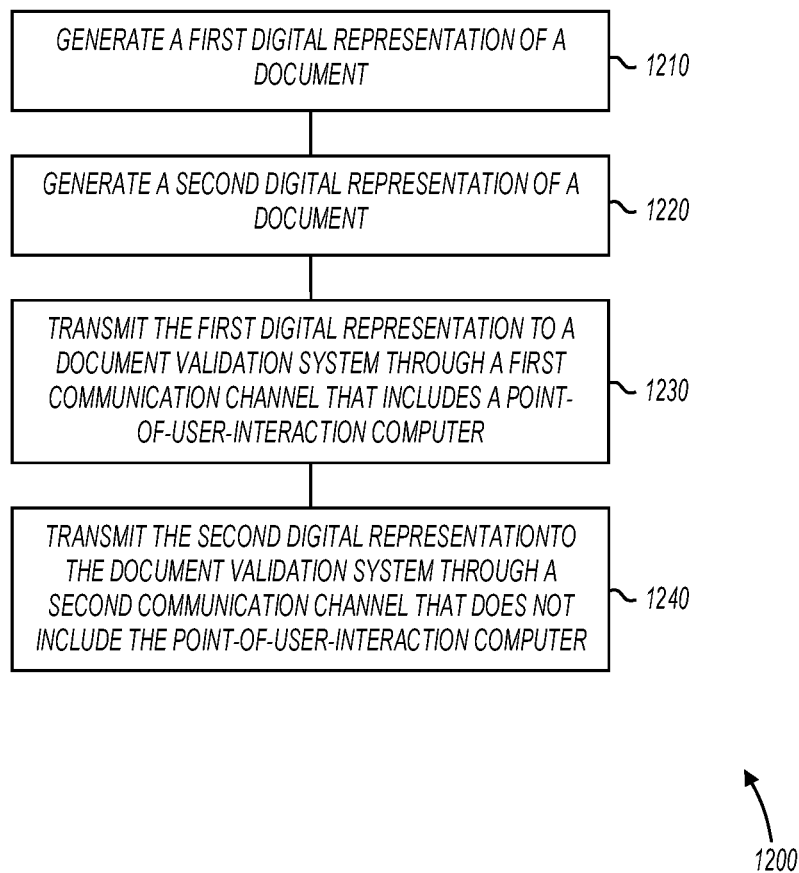

FIG. 12 shows a flowchart of methods in accordance with various embodiments of the present invention. In some embodiments, method 1200 may be performed by a user device such as any of user devices shown in, and described with reference to, previous figures. Further, in some embodiments, method 1200 may be performed by a processor that is executing software such as the various applications shown in FIG. 10. Method 1200 is not limited by the type of system or entity that performs the method. The various actions in method 1200 may be performed in the order presented, in a different order, or simultaneously. Further, in some embodiments, some actions listed in FIG. 12 are omitted from method 1200.

Method 1200 begins at 1210 in which a first digital representation of a document or contract is generated. In some embodiments, this entails generating a set of parameters that represent a document. For example, a digital representation of a voter ballot may include parameters such as voter ID, race ID and candidate selection, voter location, date, etc. Also for example, a digital representation of a negotiable instrument may include parameters such as payor ID, bank routing number, amount, date, location, etc. In some embodiments, the actions at 1210 are performed in response to processor 1050 executing instructions in digital document or contract generator application 1037 (FIG. 10).

At 1220, a second digital representation of a document or contract is generated. In some embodiments, the second digital representation is the same as the first, and in other embodiments, the second digital representation is not the same as the first. In some embodiments, one digital representation may be a subset of the other. In general, the first and second digital representations may have any relationship as described above with reference to FIG. 5. In some embodiments, the actions at 1220 are performed in response to processor 1050 executing instructions in digital document or contract generator application 1037 (FIG. 10).

At 1230, the first digital representation is transmitted to a document or contract validation system through a first communication channel that includes a point-of-user-interaction computer. An example communications channel is shown in FIG. 4 in which document or contract properties are transmitted from user device 210 to POUIC 220 and to document or contract validation system 240 as first digital representation {A}. In some embodiments, the actions at 1230 are performed in response to processor 1050 executing instructions in digital document or contract generator application 1037 (FIG. 10).

At 1240, the second digital representation of a document or contract is transmitted through a second communication channel that does not include a point-of-user-interaction computer. An example communications channel is shown in FIG. 4 in which document or contract properties are transmitted from user device 210 to document or contract validation system 240 through network 440 as second digital representation {B}. In some embodiments, the actions at 1240 are performed in response to processor 1050 executing instructions in digital document or contract generator application 1037 (FIG. 10).

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving a first digital representation of a document through a first communication channel that includes a point-of-user-interaction computer, the first digital representation at least partially originating from a user device that interacts with the point-of-user-interaction computer, the first digital representation including a first set of parameter values;
   receiving a second digital representation of the document through a second communication channel that does not include the point-of-user-interaction computer, the second digital representation at least partially originating from the user device, the second digital representation including a second set of parameter values;
   determining that the first and second digital representations represent a common document;
   creating a final digital representation of the document as a function of the first and second sets of parameter values; and
   submitting the final digital representation of the document as a valid transaction.

2. The method of claim 1 wherein creating the final digital representation of the document as the function of the first and second sets of parameter values comprises:
   printing the document; and
   scanning the document to produce the final digital representation of the document.

3. The method of claim 1 wherein determining that the first and second digital representations represent the common document comprises:
   evaluating an error function to produce a confidence value that the first and second digital representations represent the common document; and
   comparing the confidence value to a threshold.

4. The method of claim 3 wherein evaluating the error function comprises comparing the first and second sets of parameter values.

5. The method of claim 3 wherein evaluating the error function comprises comparing a location of the point-of-user-interaction computer and a location of the user device.

6. The method of claim 1 further comprising verifying, through the second communications channel, that the user device originated the first digital representation.

7. The method of claim 1 further comprising verifying, through the second communications channel, that the user device originated the second digital representation.

8. The method of claim 1 wherein the point-of-user-interaction computer comprises a voting machine.

9. The method of claim 8 wherein the document comprises a ballot.

10. The method of claim 1 wherein the point-of-user-interaction computer comprises a point-of-sale terminal.

11. The method of claim 10 wherein the document comprises a negotiable instrument.

12. A system comprising:
    a processor; and
    a non-transitory storage device configured to store instructions that when, executed by the processor, result in the system performing:
    receiving two separate representations of a document from two separate communication channels;
    evaluating a weighted error function of the two separate representations to determine the two separate representations originated from a single user device;
    printing the document;
    scanning the document to produce a scanned representation of the document; and
    submitting the scanned representation of the document as a valid transaction.

13. The system of claim 12 wherein the two separate representations comprise two separate sets of parameter values.

14. The system of claim 13 wherein evaluating the weighted error function comprises comparing the two separate sets of parameter values.

15. The system of claim 14 wherein the two separate sets of parameter values include at least one user identity parameter value.

16. The system of claim 14 wherein the two separate sets of parameter values include at least one location parameter value.

17. A system comprising:
    a communication component to receive two separate representations of a document from two separate communication channels;
    an error function component to evaluate an error function to determine that the two separate representations represent a common document;
    a printer to print the common document;
    a scanner to scan the common document and produce a scanned representation of the common document; and a submission component to submit the scanned representation as a valid transaction.

18. The system of claim 17 wherein the common document comprises a ballot.

19. The system of claim 17 wherein the common document comprises a negotiable instrument.

20. The system of claim 17 wherein the error function component is configured to compare a location parameter value included within each of the two separate representations.

* * * * *